United States Patent
Gould

[15] 3,685,877
[45] Aug. 22, 1972

[54] BALL CAGE
[72] Inventor: Robert J. Gould, Brookfield, Conn.
[73] Assignee: The Barden Corporation, Danbury, Conn.
[22] Filed: Jan. 19, 1971
[21] Appl. No.: 107,756

[52] U.S. Cl. ............................................. 308/201
[51] Int. Cl. ........................ F16c 19/20, F16c 33/38
[58] Field of Search ............... 308/201, 193, 195, 196

[56] References Cited

UNITED STATES PATENTS

| | | |
|---|---|---|
| 884,046 | 4/1908 | Schmid-Roost ............ 308/201 |
| 1,195,313 | 8/1916 | Whitmer ..................... 308/201 |
| 3,027,626 | 4/1962 | Murphy ....................... 308/201 |
| 3,399,936 | 9/1968 | Vannest ...................... 308/201 |
| 3,027,206 | 3/1962 | Potter ......................... 308/201 |
| 3,403,951 | 10/1968 | Bailey ......................... 308/201 |
| 3,529,875 | 9/1970 | McKee ....................... 308/201 |

*Primary Examiner*—Martin P. Schwadron
*Assistant Examiner*—Frank Susko
*Attorney*—Shenier and O'Connor

[57] ABSTRACT

An improved ball-bearing cage comprising an annular body formed with radially-extending ball pockets in which material is removed in an axial direction at the sides of the pockets adjacent to the locus of the ball centers to cause the balls to contact the remainder of the pocket wall in the fore-and-aft direction of rolling movement thus reducing ball-to-cage contact area and side shear area.

5 Claims, 8 Drawing Figures

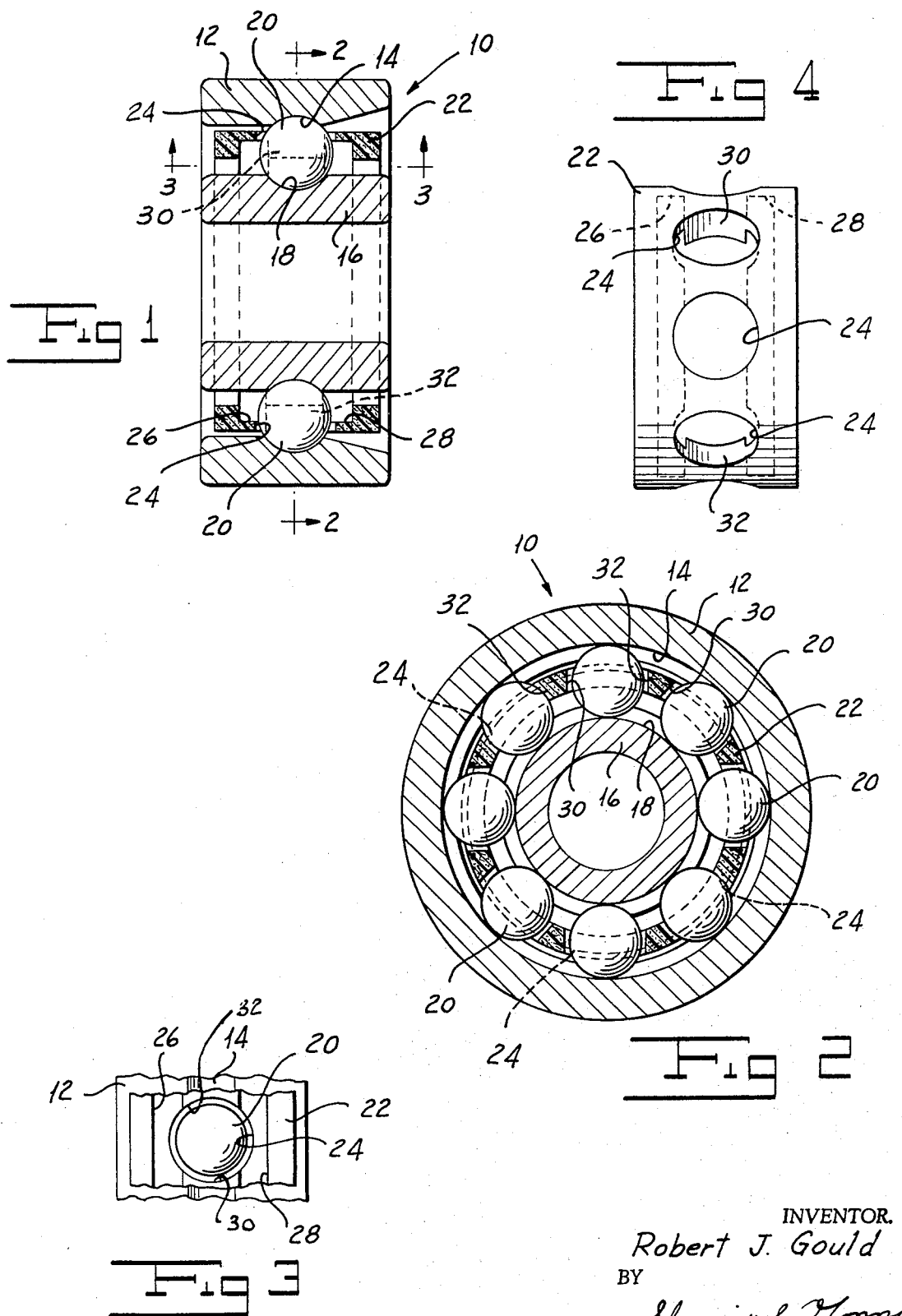

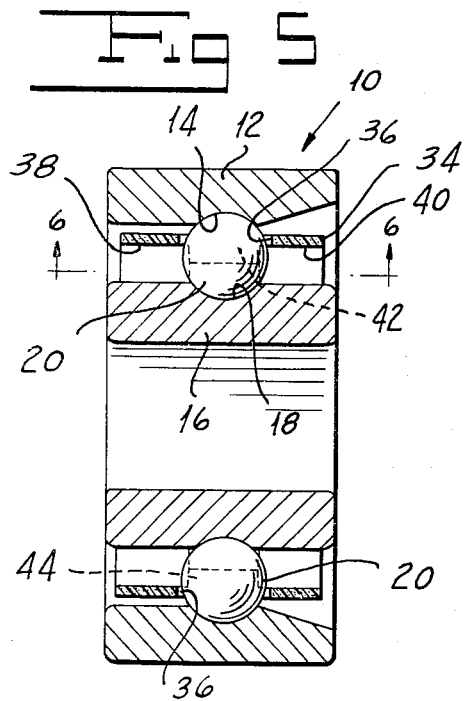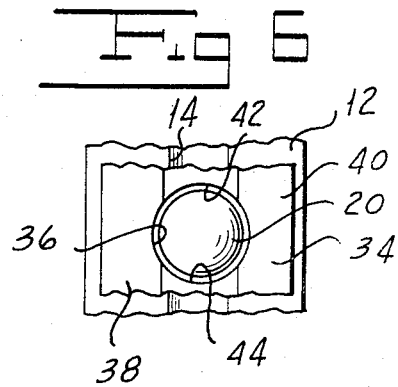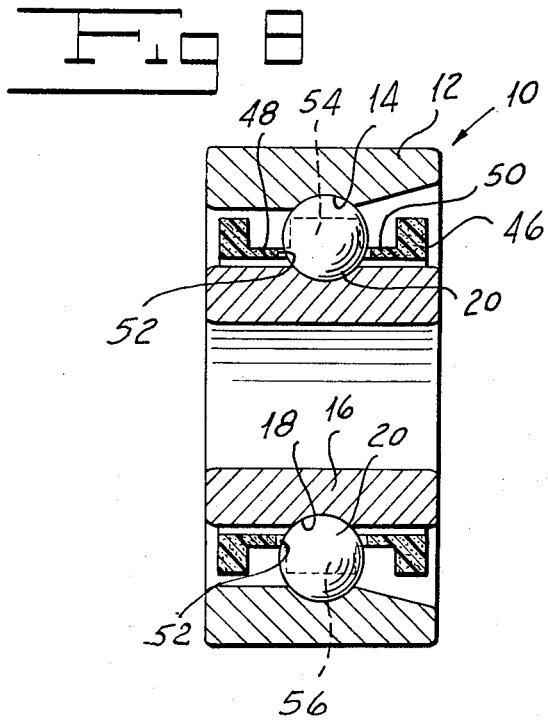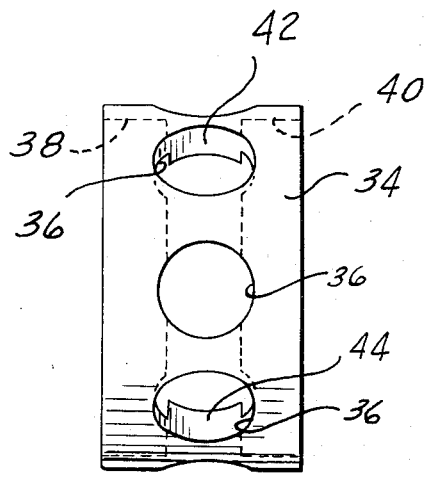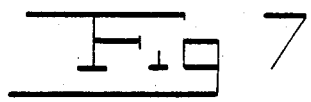

BALL CAGE

BACKGROUND OF THE INVENTION

There are known in the prior art various forms of ball retainers or cages for use with ball bearings. Many of these retainers comprise an annular body of sintered nylon or similar material formed with radially-extending bores to provide pockets for receiving the balls. In operation of a bearing provided with such a retainer, one of the rings is driven to rotate the balls and to drive the balls in the direction of rotation of the ring. The balls in turn engage the pocket walls to drive the retainer. Ideally, there is substantially point contact between a ball and a wall of its cage in the direction of movement of the cage. Such, however, is not the case in practice. Owing to slight imperfections in the balls or in the raceways the balls also engage the pockets at the axial sides thereof resulting in undesireable resistance to rolling movement and in instability.

I have invented an improved ball-bearing cage which overcomes defects of cages of the type known in the prior art. My ball-bearing cage results in a bearing which operates in a more stable manner than do bearings provided with cages of the type known in the prior art. I so construct my improved bearing cage as to reduce the overall ball-to-cage contact and to reduce the side shear area. My bearing cage has less resistance to rolling motion than do bearing cages of the prior art. It provides a smoother, quieter-running bearing. It is relatively inexpensive for the result achieved thereby.

SUMMARY OF THE INVENTION

One object of my invention is to provide an improved ball-bearing cage which overcomes the defects of bearing cages of the prior art.

Another object of my invention is to provide an improved ball-bearing cage which results in a more stable bearing than those provided with cages of the type known in the prior art.

A further object of my invention is to provide a ball-bearing cage resulting in a smoother and quieter running bearing.

A still further object of my invention is to provide an improved ball-bearing cage which is relatively inexpensive for the result achieved thereby.

In general my invention contemplates the provision of a ball-bearing cage comprising an annular body provided with radially-extending bores forming ball pockets in which I remove material in the axial direction from the walls of the ball pockets adjacent to the locus of the ball centers to leave portions of the pocket wall which are engaged by the ball in the fore-and-aft rolling directions while reducing overall ball-to-cage contact area and side shear areas.

A BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a sectional view of an annular contact bearing provided with one form of my improved bearing cage.

FIG. 2 is a sectional view of the bearing assembly illustrated in FIG. 1 taken along the line of 2—2 of FIG. 1.

FIG. 3 is a fragmentary view of a portion of the assembly shown in FIG. 1 taken along the line 3—3 of FIG. 1.

FIG. 4 is an elevation of the form of my improved bearing cage shown in FIGS. 1 to 3.

FIG. 5 is a sectional view of a bearing assembly provided with an alternate embodiment of my improved ball cage.

FIG. 6 is a fragmentary view of the assembly illustrated in FIG. 5 taken along the line 6—6 of FIG. 5.

FIG. 7 is an elevation of the form of my retainer illustrated in FIGS. 5 and 6.

FIG. 8 is a sectional view of yet another embodiment of my improved bearing cage.

DESCRIPTION OF THE PREFERRED EMBODIMENT

Referring now to FIGS. 1 to 4 of the drawings my improved cage to be described in detail hereinafter may form a part of a bearing assembly indicated generally by reference character 10 of the angular contact type comprising an outer ring 12 formed with a raceway 14, an inner ring 16 formed with a raceway 18, and balls 20 located between the rings in the raceways 14 and 18. This form of my improved cage comprises an annular body 22 of any suitable material such, for example, as porous, sintered nylon or the like. I provide the body 22 with a plurality of spaced bores 24 forming pockets for the balls 20. I also form respective spaced, radially-extending, circumferential grooves 26 and 28 in the interior of the body 22. In this way I remove portions of the walls of pockets 24 in an axial direction and adjacent to the locus of the centers of the balls 20. As a result of the removal of material in the manner just described there remain fore and aft surfaces 30 and 32 of the pockets extending through the locus of the centers of the balls 20.

In operation of a bearing provided with the cage 22 just described as one of the rings 12 or 16 is driven the balls rotate around their centers and also revolve in the direction of rotation of the driven ring. As this occurs the balls engage either the surfaces 30 or the surfaces 32 depending upon the direction of rotation. Thus the cage 22 is driven. It will be appreciated that this construction affords considerable axial movement for the balls 20 while eliminating the resistance which is occasioned in the prior art by the engagement of the balls with the axial sides of the pocket. As a result, a bearing assembly 10 provided with my cage 22 operates more quietly and in a smoother manner than do bearings of the prior art provided with cages of the prior art.

Referring to FIGS. 5 to 7 I have shown another form of my cage 34 including an annular body in which I first form radially-extending bores 36 to provide ball pockets. After the pockets have been provided in the annular body I next counterbore the body from the respective ends thereof to provide counterbores 38 and 40 leading from the edges of the annular body inwardly so as to extend for a short distance into the pockets thus to remove the pocket walls at the axial ends of the cage. In this way I form the respective surfaces 42 and 44 which are engaged by the balls in the fore-and-aft directions of movement thereof while reducing the overall contact area between the balls and the pocket walls and substantially reducing the side shear area. The operation of this form of my cage is substantially the same as that described hereinabove in connection with FIGS. 1 to 4.

Referring now to FIG. 8 I have shown a still further form of my cage including the annular body 46 which is provided with radially-extending ball pockets 52 and which is formed with radially inwardly extending circumferential grooves 48 and 50 so located as to cut away the axial sides of the wall of the pockets 52. This form of my cage may be desirable where the cage is to be under the control of the inner ring 16 rather than the outer ring 12 as shown in FIGS. 1 to 7. It will be appreciated, of course, that the grooves 48 and 50 could be continued outwardly to the axial outward edges of the body 40.

In making the form of my retainer illustrated in FIGS. 1 to 3 after formation of the annular body 22 of a suitable material such as porous, sintered nylon it may be drilled to form the pockets 24. Next the respective grooves 26 and 28 can be cut in the inner surface of the body by any suitable machining operation such as one performs on a lathe. The distance for which the inner edges of the grooves 26 and 28 extend into the pockets 24 can be determined empirically for the best results.

In making the form of my retainer illustrated in FIGS. 5 to 7 after the body 34 has been drilled to provide the pockets 42 counterbores 38 and 34 may be formed in the respective ends of the body for a distance such as provides the desired result. The form of my retainer illustrated in FIG. 8 may be made in a manner similar to that described hereinabove in connection with FIGS. 1 to 4.

The operation of all forms of my retainer is substantially the same. When the bearing ring is driven so as to rotate the balls they revolve around the raceways and in turn drive the retainer or cage. In each instance the driving force imparted to the cage is by virtue of the remaining surfaces of the pocket such as for example surfaces 30 and 32. Substantial axial movement of the balls is permitted without excessive resistance to revolution of the balls. Since the ball-to-cage contact area is small and owing to the fact that there is a relatively large amount of axial movement permitted the bearing runs smoother and quieter than do bearings provided with cages of the type known in the prior art.

It will be seen that I have accomplished the objects of my invention. I have provided a ball-bearing cage which results in a smoother and quieter running bearing. My bearing cage reduces the overall ball-to-cage contact area and permits substantial axial movement of the balls without excessive resistance to movement thereof. It is relatively inexpensive to construct for the result achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A bearing cage for receiving balls with the centers thereof positioned on an intended locus, said cage comprising an annular body extending through said locus, said body being formed with a plurality of radially extending generally continuously untapered cylindrical circumferentially spaced generally centrally located openings for receiving said balls, said openings having a diameter slightly greater than that of said balls, said body being formed with respective circumferential recesses axially spaced from said locus at each side thereof, said recesses having axially and circumferentially extending bases, said recesses extending radially through projections on said locus, each of said openings extending into said recesses to a location at which it is generally tangent to circles in the bases of the respective recesses.

2. A bearing cage as in claim 1 in which said recesses are grooves having a rectangular cross section.

3. A bearing cage as in claim 1 in which said recesses extend radially inwardly from the outer surface of said body.

4. A bearing cage as in claim 1 in which said recesses extend radially outwardly from the inner surface of said body.

5. A bearing cage as in claim 1 in which each of said recesses has an inner edge on the locus of a circle passing through said openings and has an outer edge axially spaced from the circle on the base of said recess.

* * * * *